US009307432B2

(12) United States Patent
Gao et al.

(10) Patent No.: US 9,307,432 B2
(45) Date of Patent: Apr. 5, 2016

(54) PROCESSING DELAY ESTIMATE BASED ON CROWDSOURCING DATA

(71) Applicant: QUALCOMM Incorporated, San Diego, CA (US)

(72) Inventors: Weihua Gao, San Jose, CA (US); Sai Pradeep Venkatraman, Santa Clara, CA (US); Amir A. Emadzadeh, Santa Clara, CA (US); Ju-Yong Do, Palo Alto, CA (US); Gengsheng Zhang, Cupertino, CA (US); Lionel Jacques Garin, Palo Alto, CA (US); Sundar Raman, Fremont, CA (US)

(73) Assignee: Qualcomm Incorporated, San Diego, CA (US)

( * ) Notice: Subject to any disclaimer, the term of this patent is extended or adjusted under 35 U.S.C. 154(b) by 424 days.

(21) Appl. No.: 13/733,560

(22) Filed: Jan. 3, 2013

(65) Prior Publication Data

US 2014/0185520 A1 Jul. 3, 2014

(51) Int. Cl.
 H04W 24/10 (2009.01)
 H04W 64/00 (2009.01)
 G01S 5/02 (2010.01)
(52) U.S. Cl.
 CPC ............. *H04W 24/10* (2013.01); *G01S 5/0242* (2013.01); *H04W 64/00* (2013.01)
(58) Field of Classification Search
 CPC .................................................... H04W 64/00
 See application file for complete search history.

(56) References Cited

U.S. PATENT DOCUMENTS

| 2006/0218264 | A1* | 9/2006 | Ogawa et al. ................. 709/223 |
| 2010/0130229 | A1 | 5/2010 | Sridhara et al. |
| 2010/0135178 | A1 | 6/2010 | Aggarwal et al. |
| 2013/0170374 | A1* | 7/2013 | Aljadeff ........................ 370/252 |
| 2013/0308547 | A1* | 11/2013 | Ihm et al. ...................... 370/328 |

FOREIGN PATENT DOCUMENTS

| WO | WO-2011137396 A1 | 11/2011 |
| WO | WO-2012158463 A1 | 11/2012 |

OTHER PUBLICATIONS

Ciurana M., et al., "A ranging system with IEEE 802.11 data frames," IEEE Radio and Wireless Symposium, Jan. 1, 2007, pp. 133-136, XP031080050, DOI: 10.1109/RWS.2007.351785, ISBN: 978-10-4244-0444-5, Chapter II, III.
International Search Report and Written Opinion—PCT/US2013/074694—ISA/EPO—Jun. 5, 2014.

* cited by examiner

*Primary Examiner* — Dang Ton
*Assistant Examiner* — Kevin Lee
(74) *Attorney, Agent, or Firm* — Kilpatrick Townsend & Stockton LLP

(57) ABSTRACT

Techniques are provided for providing a processing delay estimate of an access point, or turnaround calibration function (TCF), associated with round trip time (RTT) measurements. Mobile devices, access points, and/or other systems can utilize these techniques to derive processing delay from the RTT measurements. Crowdsourcing can also be used to help increase the accuracy of the processing delay estimate, which can be propagated to multiple devices.

60 Claims, 9 Drawing Sheets

| RSSI (dBm) | RTT (ns) |
|---|---|
| -35 | 1600 |
| -39 | 1730 |
| -30 | 1723 |
| -35 | 1800 |
| -87 | 1985 |
| -90 | 2100 |

PROCESSING DELAY ESTIMATE BASED ON CROWDSOURCING DATA

BACKGROUND

Mobile communications networks are in the process of offering increasingly sophisticated capabilities associated with the motion and/or position location sensing of a mobile device. New software applications, such as, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States.

Round trip time (RTT) measurement techniques can be one way to accurately determine position. These techniques typically involve knowledge of time delays incurred by the wireless signals as they propagate through various network devices, such as wireless access points (APs), comprising the network. Such delays may be spatially variant due to, for example, multipath and/or signal interference. Moreover, such processing delays may change over time based upon the type of network device and/or the network device's current networking load. Because these processing delays can be substantially larger than other aspects of RTT measurements (e.g., time of flight), accurate processing delay estimates are important in obtaining accurate position determinations using RTT measurements.

SUMMARY

Embodiments of the present invention are directed toward providing a processing delay estimate of an access point (AP), or turnaround calibration function (TCF), associated with round trip time (RTT) measurements. Embodiments can, for example, enable mobile devices, APs, and/or other systems to derive processing delay from RTT measurements. Embodiments can also utilize crowdsourcing to help increase the accuracy of the processing delay estimate, which can be propagated to multiple devices.

An example method for using a mobile device to provide a processing delay estimate associated with round trip time (RTT) measurements of a wireless access point, according to the description, includes obtaining, at the mobile device, a plurality of received signal strength indication (RSSI) measurements measuring a signal strength of the wireless access point at the mobile device, obtaining a plurality of RTT measurements comprising an RTT measurement corresponding to each RSSI measurement of the plurality of RSSI measurements, and determining a first processing delay estimate using one or more RTT measurements of the plurality of RTT measurements. The one or more RTT measurements are selected using at least one of the RSSI measurements corresponding to the one or more RTT measurements. The method further includes sending, using the mobile device, the first processing delay estimate.

An example method for crowdsourcing a processing delay estimate of a wireless access point, according to the description, includes receiving processing delay data relating to the wireless access point, where the processing delay data comprising at least one RTT measurement. The method further includes determining the processing delay estimate of the wireless access point, based on the processing delay data, and sending the processing delay estimate via a wireless communications interface.

An example mobile device adapted to provide a processing delay estimate of a wireless access point associated with RTT measurements, according to the description, includes a wireless communications interface, a processing unit communicatively coupled with the wireless communications interface, and a memory coupled to the processing unit. The memory stores executable instructions for causing the processing unit to obtain a plurality of RSSI measurements measuring a signal strength of the wireless access point at the mobile device, obtain a plurality of RTT measurements comprising an RTT measurement corresponding to each RSSI measurement of the plurality of RSSI measurements, and determine a first processing delay estimate using one or more RTT measurements of the plurality of RTT measurements. The one or more RTT measurements are selected using at least one of the RSSI measurements corresponding to the one or more RTT measurements. The memory further stores executable instructions for causing the processing unit to send the first processing delay estimate.

An example server for crowdsourcing a processing delay estimate of a wireless access point, according to the description, includes a wireless communications interface, a processing unit communicatively coupled with the wireless communications interface, and a memory coupled to the processing unit. The memory stores executable instructions for causing the processing unit to receive, via the wireless communications interface, processing delay data of the wireless access point. The processing delay data comprises at least one RTT measurement. The memory further stores executable instructions for causing the processing unit to determine the processing delay estimate of the wireless access point, based on the processing delay data, and send the processing delay estimate via the wireless communications interface.

An example non-transitory computer-readable storage medium, according to the description, has instructions stored thereon for causing a processing unit to obtain a plurality of RSSI measurements measuring a signal strength of a wireless access point at a mobile device, obtain a plurality of RTT measurements comprising an RTT measurement corresponding to each RSSI measurement of the plurality of RSSI measurements, and determine a first processing delay estimate using one or more RTT measurements of the plurality of RTT measurements. The one or more RTT measurements are selected using at least one of the RSSI measurements corresponding to the one or more RTT measurements. The medium further includes instructions for causing the processing unit to send the first processing delay estimate.

An example non-transitory computer-readable storage medium, according to the description, has instructions stored thereon for causing a processing unit to receive processing delay data of a wireless access point. The processing delay data comprises at least one RTT measurement. The medium further includes instructions for causing the processing unit to determine a processing delay estimate of the wireless access point, based on the processing delay data, and send the processing delay estimate via a wireless communications interface An example mobile device, according to the description, includes means for obtaining a plurality of RSSI measurements measuring a signal strength of a wireless access point at the mobile device, means for obtaining a plurality of RTT measurements comprising an RTT measurement corresponding to each RSSI measurement of the plurality of RSSI measurements, and means for determining a first processing delay estimate using one or more RTT measurements of the plurality of RTT measurements. The one or more RTT measurements are selected using at least one of the RSSI measurements corresponding to the one or more RTT measurements. The mobile device further includes means for sending, using the mobile device, the first processing delay estimate.

An example system, according to the description, includes means for receiving processing delay data of a wireless access point, where the processing delay data comprises at least one RTT measurement. The system further includes means for determining a processing delay estimate of the wireless access point, based on the processing delay data, and means for sending the processing delay estimate via a wireless communications interface.

Items and/or techniques described herein may provide one or more of the following capabilities, as well as other capabilities not mentioned. Techniques can provide for increased positioning accuracy and efficiency. Moreover, embodiments can provide processing delay estimates with or without location information of a mobile device. These and other embodiments, along with many of its advantages and features, are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
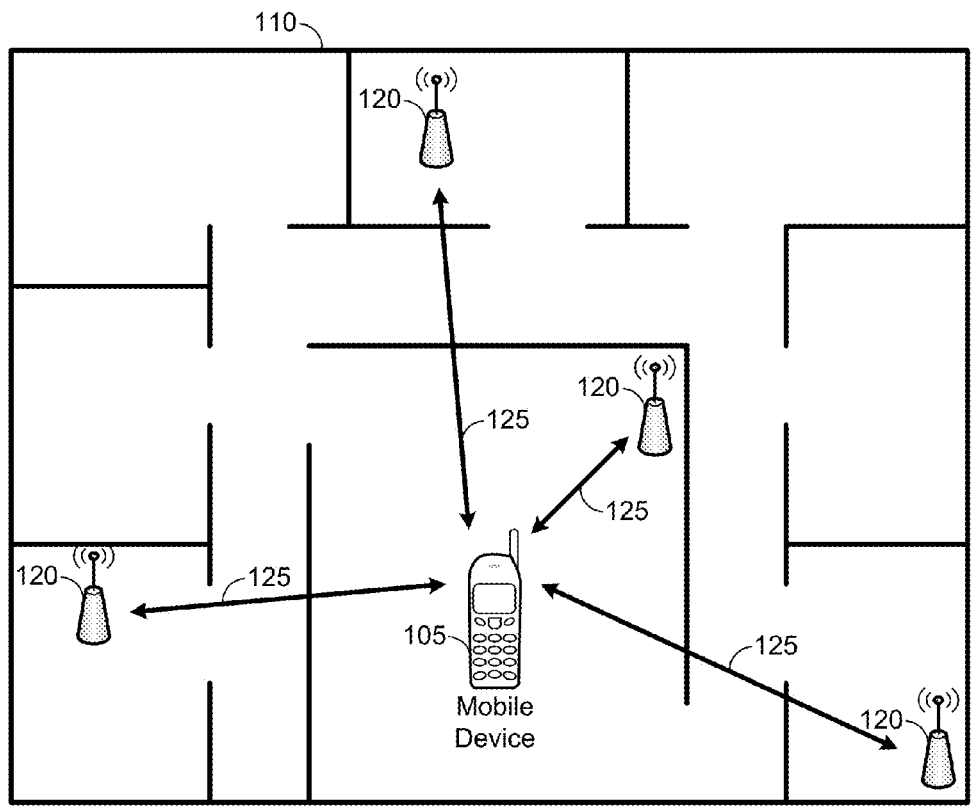
FIG. 1 is a simplified illustration of components of a positioning system, according to one embodiment.

The following description is provided with reference to the drawings, where like reference numerals are used to refer to like elements throughout. While various details of one or more techniques are described herein, other techniques are also possible. In some instances, structures, and devices are shown in block diagram form in order to facilitate describing various techniques. Additionally, well-known elements of the invention will not be described in detail or will be omitted so as not to obscure the relevant details of the invention.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Different techniques disclosed herein may be used to estimate the location of a mobile device such as a cell phone, personal digital assistant (PDA), tablet computer, personal media player, gaming device, and the like, according to the desired functionality of the mobile device. For example, some mobile devices may process signals received from a Satellite Positioning System (SPS) to estimate their locations for navigation, social media location information, location tracking, and the like. However, sometimes there are certain areas where navigation signals from an SPS may not be available, such as in certain indoor locations.

To determine its location without SPS signals, a mobile device can utilize alternative means provided in a positioning system. For instance, a mobile device can transmit a signal to a wireless access point (AP) of the positioning system and measure a length of time until a response signal from the wireless AP is received. (As provided herein, a wireless AP may comprise a device that allows wireless communication devices to communicate with a network.) A range from the mobile device to the wireless AP may be determined based upon the measured length of time between transmission of a signal from the mobile device and receipt of a response signal at the mobile device (e.g., round trip time (RTT)). Alternatively, signal strength of a signal received from the AP may be measured and a range from the mobile device to the AP may be estimated based on the measured signal strength (e.g., received signal strength indication (RSSI)). In this manner, a location of the mobile device can be determined.

FIG. 1 is a simplified illustration of components of a positioning system 100, according to one embodiment. The positioning system can include a mobile device 105, and one or more wireless APs 120 in an indoor environment 110. Other components of the positioning system, which are not shown, can include SPS satellites, a mobile network provider, base transceiver stations, a location server, a map server, and the like. Moreover, the positioning system 100 can be integrated into and/or communicatively connected with a communication network, as detailed below. It should be noted that FIG. 1 provides only a generalized illustration of various components, any or all of which may be utilized as appropriate. Furthermore, components may be combined, separated, substituted, and/or omitted, depending on desired functionality. A person of ordinary skill in the art will recognize many modifications to the components illustrated.

In the positioning system 100, a location of the mobile device 105 can be determined using RTT and/or RSSI measurements in a variety of ways. In some embodiments, for example, the location of the mobile device 105 can be calculated using triangulation and/or other positioning techniques, which may utilize RTT and/or RSSI range models. Other embodiments may adaptively change the ranging models, such as, for example, using RTT measurements that are adjusted to accommodate for processing delays introduced by the wireless AP(s) 120. The processing delays may vary among different APs and may also change over time. By using supplemental information, such as, for example, a processing delay estimate, the position may be determined and/or the effects of the processing delays introduced by the wireless APs can be calibrated using iterative techniques.

A mobile device 105 can communicate with the wireless the AP(s) 120 via one or more communication links 125 for wireless voice and/or data communication. The wireless AP(s) 120 also can act as independent sources of position data, e.g., through implementation of trilateration-based procedures based, for example, on RTT and/or RSSI measurements. Further example embodiments of determining position of a mobile device using wireless AP(s) 120 are provided in U.S. patent application Ser. No. 12/622,289, entitled "WIRELESS POSITION DETERMINATION USING ADJUSTED ROUND TRIP TIME MEASUREMENTS," the content of which is hereby incorporated by reference in its entirety. The AP(s) 120 can be part of a Wireless Local Area Network (WLAN) that operates in a building to perform communications over smaller geographic regions than a wide area wireless network (WWAN). The wireless AP(s) 120 can be part of a WiFi network (802.11x), cellular piconets and/or femtocells, Bluetooth network, and the like. The wireless AP(s) 120 can also form part of a Qualcomm indoor positioning system (QUIPS™). Embodiments may include any number of wireless AP(s) 120, any of which may be a moveable node, or may be otherwise capable of being relocated.

As explained in more detail herein below, a single mobile device 105 can take RSSI and/or RTT measurements at different times and/or different locations to facilitate an estimation of a processing delay of a wireless AP(s) 120. Moreover, in some embodiments, the mobile device 105 can provide the processing delay estimate based on the RTT and RSSI measurements. In some embodiments, the mobile device 105 can provide these measurements to a server for processing delay estimate. Furthermore, a server may obtain processing delay estimates and/or RTT and RSSI measurements from a plurality of mobile devices to increase the accuracy of the estimated processing delay via crowdsourcing.

Figure 2:
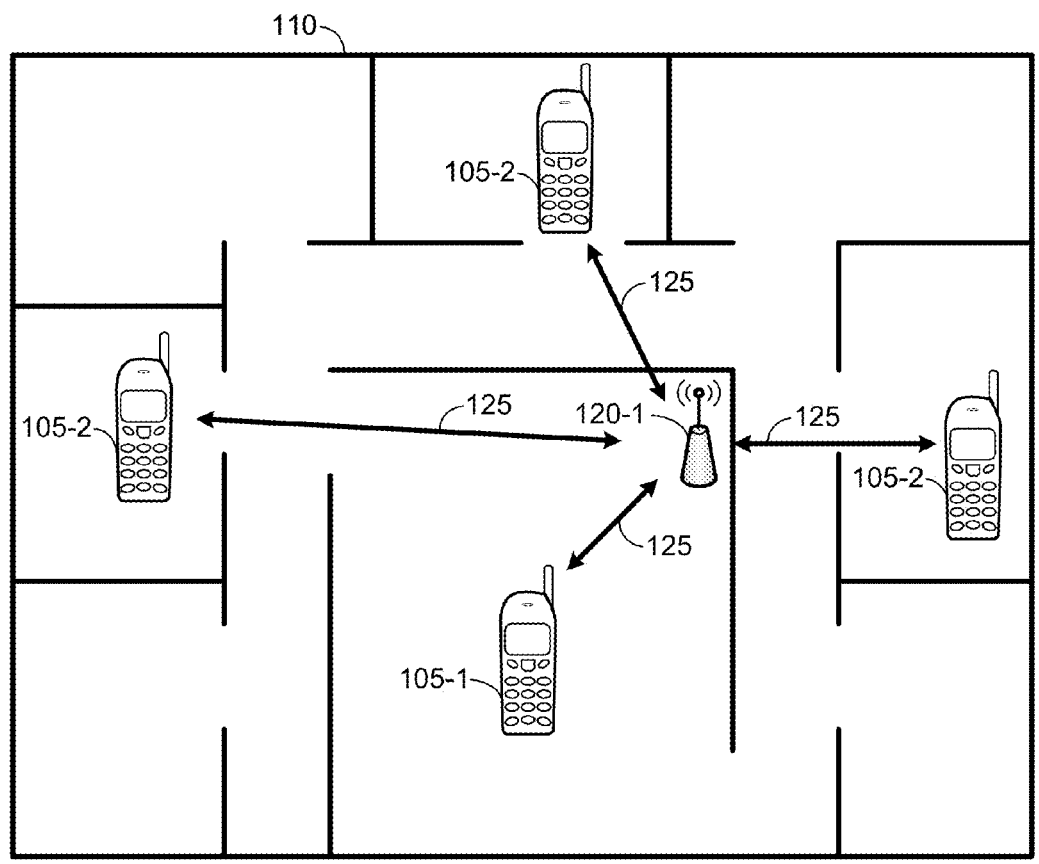
FIG. 2 is another simplified illustration of the embodiment of components of the positioning system of FIG. 1 in relation to a particular wireless access point (AP).

FIG. 2 is a simplified illustration of an embodiment of components of the positioning system 100 in relation to a particular wireless AP 120-1, to help illustrate how processing delay estimates, RSSI measurements, RTT measurements, and/or other data relating to a processing delay can be crowdsourced. For example, according to some embodiments, a first mobile device 105-1 proximate to the wireless AP 120-1 can obtain one or more RSSI and/or RTT measurements, measuring the signal strength and round trip time associated with the AP. Depending on desired functionality, these measurements may be periodic (e.g., every 1, 2, 3, 5, 10 seconds, etc.), location based, performed on demand (e.g., a request made by an application executed by the first mobile device 105-1 and/or wireless AP 120-1), and the like. The mobile device 105-1 can then calculate an processing delay estimate for the wireless AP 120-1, which it can send to the wireless AP 120-1. As indicated previously, in some embodiments, the first mobile device 105-1 can additionally or alternatively send the raw RSSI and RTT measurements of the wireless AP 120-1.

For its part, the wireless AP 120-1, which can include, be incorporated into, and/or be communicatively coupled with a server, can receive the data relating to the processing delay (e.g., the processing delay estimate and/or raw RSSI and RTT measurements), calculate a processing delay estimate if necessary, and/or store the processing delay estimate in a memory (e.g., database), which it can maintain and update using further information regarding the processing delay (e.g., TCF) of the wireless AP 120-1. Furthermore, the wireless AP 120-1 can propagate the processing delay estimate to other mobile devices 105-2 to help further increase the accuracy of location determinations of the other mobile devices 105-2 that use RTT measurements with the wireless AP 120-1. Additionally or alternatively, the first mobile device 105-1 can send the estimated processing delay of the wireless AP 120-1 via other communication channels, such as direct peer-to-peer communication. By crowdsourcing information in this manner, the positioning system 100 can provide accurate processing delay estimates without the need for war-driving or war-walking (e.g., manual, deliberate signal collection), which can be expensive and does not scale easily.

The estimated processing delay of a wireless AP 120 can be derived from RTT measurements, which can represent the processing delay (approximately) when the mobile device 105 is very close to the wireless AP 120. In other words, virtually all of the round trip time of a signal in these RTT measurements is due to processing delay, rather than time of flight between the mobile device 105 and the wireless AP 120. After compensating for any delay in the measurement from the mobile device 105 (i.e., the time it takes to receive and process the RTT signal), if necessary, the RTT measurements approximately represent the TCF delay of the wireless AP 120.

Figures 3, 4:
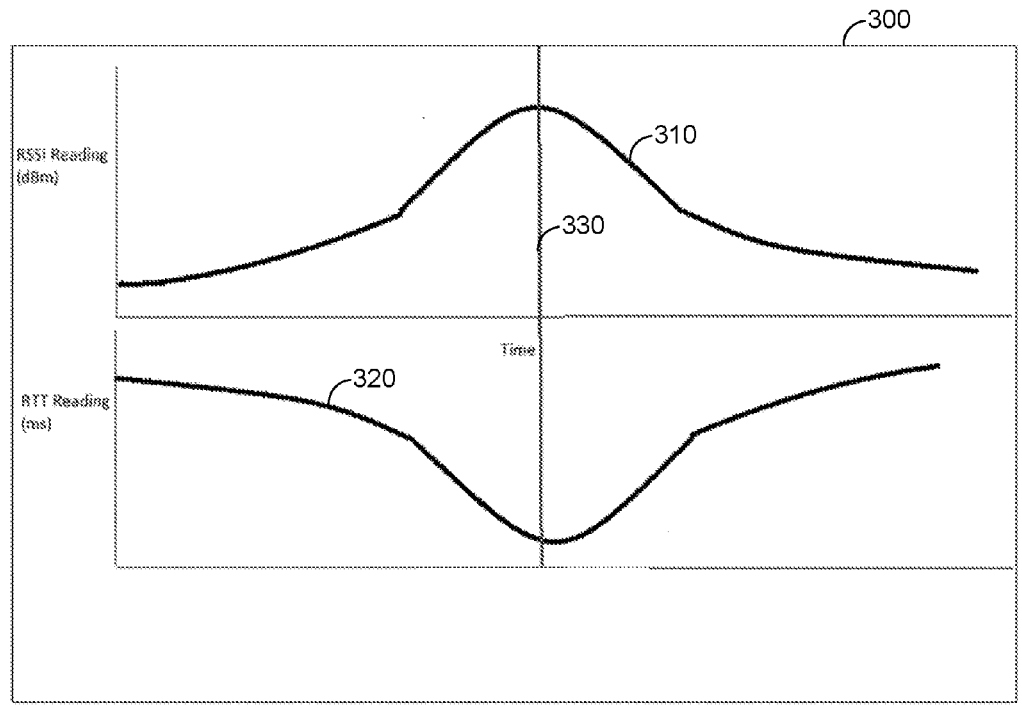
FIG. 3 is a graph illustrating a correlation between received signal strength indication (RSSI) and round trip time (RTT) measurements.
FIG. 4 illustrates a table of values for RSSI and RTT measurements.

The proximity of the mobile device 105 to the wireless AP 120 can be determined based on a correlation between the RTT measurements and corresponding RSSI measurements taken at approximately the same time (and location). An example of this correlation is illustrated in FIG. 3, which shows a graph 300 with RSSI measurements 310 and RTT measurements 320 over time as a mobile device 105 passes by a wireless AP 120. The RSSI measurements increase as the mobile device 105 approaches the wireless AP 120 and peak at a time 330 when the mobile device 105 is approximately closest to the wireless AP 120, decreasing thereafter as the mobile device moves away. Because RTT measurements are reversely correlated with the RSSI measurements, the RTT measurements show an inverse pattern, with the minimum RTT measurement occurring at approximately the same time 330 as the maximum RSSI measurement. Thus, a mobile device can take RSSI and RTT measurement over time, storing these measurements in a memory, to track this correlation and determine the time 330 at which the mobile device 105 is closest to the wireless AP 120. A subset of one or more of the RTT measurements at or near this time 330 can be used to approximate the propagation delay of the wireless AP 20.

Although, as shown, the RTT and RSSI measurements are (reversely) correlated, both sets of measurements can be useful in determining the time 330. Rather than simply relying on a lowest RTT measurement to determine the processing delay of the wireless AP, the RSSI measurements are also used to help reduce the likelihood of determining the processing delay based on an erroneous measurement. For example, RTT measurements may not be precise, particularly in relatively low-bandwidth applications. Thus, RTT measurements taken alone can have a degree of ambiguity that can result in inaccurate processing delay estimates. However, RSSI measurements can be used to validate RTT measurements, significantly reducing these ambiguities. In some embodiments, other outlier detection techniques may be used additionally or alternatively.

RSSI measurement can also be used to help ensure the proximity of the mobile device 105 to the wireless AP 120. Just because the maximum RSSI measurement and the minimum RTT measurement occur at approximately the same time 330, does not guarantee that the mobile device 105 is close enough to the wireless AP 120 for the RTT measurement to approximate the wireless AP's processing delay. Thus, to help ensure the RSSI and RTT measurements represent measurements taken when the mobile device 105 and the wireless AP 120 are close and/or within a line of sight, a threshold RSSI measurement value can be set, below which the RSSI and RTT measurements can be ignored. For example, according to some embodiments, RSSI measurements—and corresponding RTT measurements—are ignored if they have a value of less than −40 dBm. Of course, the threshold value can vary, based on desired functionality, hardware, and/or other factors. Some embodiments may have threshold values at −35 dBM, −45 dBm, or any value in between. Yet other embodiments may have threshold values outside this range. Thus, in some embodiments, the propagation delay estimate is based on only a subset of the RSSI and RTT measurements.

Some embodiments can provide a processing delay estimate regardless of whether the mobile device 105 ever comes physically proximate to the wireless AP 120 by compensating for a distance. For each RTT measurement, for example, a pseudo range can be calculated from the corresponding RSSI measurement using a propagation channel model based upon a map of the wireless AP deployment. The duration it takes for a signal to travel this distance (to and from the AP) can then be subtracted from the RTT measurement to provide the estimated propagation delay. Because the accuracy of ranging calculations based on RSSI measurements generally decreases as the value of RSSI measurements decrease, resulting processing delay estimates can be weighted accordingly, as described in more detail below.

For embodiments in which multiple RTT measurements are taken, including any of the embodiments described previously, additional calculations can be made, using a subset of the RTT measurements to provide a mean, standard deviation, weighted average, and/or another confidence value indicating a confidence level of an RTT measurement and/or propagation delay estimate. For example, an embodiment that provides a processing delay estimate that compensates for distances can compute a weighted average of the estimated processing delays calculated from each of the RTT measurement. The weight of each estimated processing delay for example, can be reduced as the distance (i.e., pseudo range) associated with each corresponding RTT measurement increases.

FIG. 4 is a table 400 of RSSI and RTT measurements that helps further illustrate how a processing delay can be estimated. Such a table can, for example, be part of a database or other memory structure stored in a memory of a mobile device 105, server, and/or another device used to determine a processing delay estimate. Moreover, devices can have multiple tables, each table storing RSSI and RTT measurements for a different wireless AP. Depending on desired functionality, the RSSI and RTT measurements can represent cumulative data for a period of time in which the mobile device 105 may have approached the wireless AP 120 one or more times. In some embodiments, such as those in which the table 400 is stored on a server, the table 400 can include RSSI and RTT measurements from multiple mobile devices 105. In some embodiments, the RTT measurements represent processing delay estimates (e.g., RTT measurements corresponding to the lowest-value RSSI measurements) from multiple mobile devices 105.

In some embodiments, the table 400 may represent raw RSSI and RTT measurements (e.g., all measurements, all measurements in which the corresponding RSSI measurement value is above a certain threshold, etc.) from multiple mobile devices 105. These embodiments can enable a server to collect raw data from multiple mobile devices 105 and calculate a processing delay estimate, providing lower processing requirements on the mobile devices 105 than in other embodiments.

The processing delay estimate can be obtained from the information in the table 400 in a variety of ways. For example, the RTT measurement corresponding to the lowest-value RSSI measurement may simply be selected as the processing delay estimate. Additionally or alternatively, a weighted mean and/or weighted average of RTT values could be calculated, where more weight is given to RTT measurements corresponding to low-value RSSI measurements. Other weighting factors such as mobile device type could also be used. Estimating the processing delay can optionally include ignoring RTT measurements 420 corresponding to RSSI measurements below a certain threshold value, and averaging (using weighting or not) the subset of the RTT measurements that remain 410. More—even all—RTT measurements can be used in embodiments that compensate for distance by calculating a pseudo range using the RSSI measurement value and subtracting the resulting flight time from the RTT measurement value. Some embodiments, however, may utilize this distance compensation together with a threshold value.

Different types of mobile devices, such as different makes and models of mobile phones, can measure RSSI and/or RTT differently. These differences can stem from differences in antennas, chipsets, and/or other hardware features. There can also be differences in the reliability of RSSI and/or RTT measurements. With this in mind, the table 400 may be adjusted to compensate these differences. In some embodiments, for example, a device can provide a server with information indicative of one or more hardware features of the mobile device so that RSSI and RTT measurements received by the server from the device can be adjusted accordingly. Example hardware features could include the make and/or model of the device, a chipset, antenna, and/or the like. The server can then utilize a lookup table to determine how the RSSI and/or RTT measurements received from that mobile device should be adjusted, if at all.

Figure 5A:
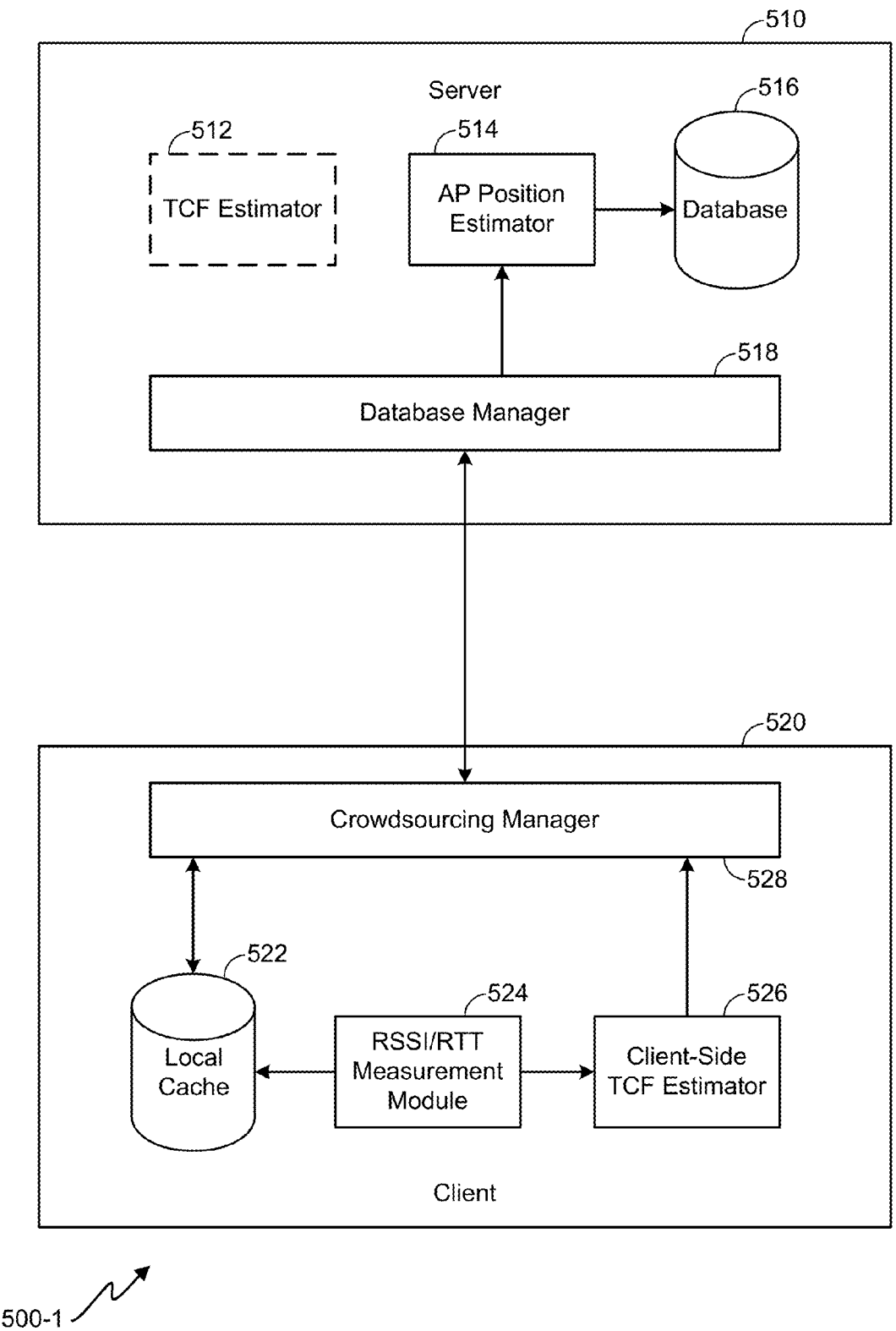
FIGS. 5A and 5B illustrate different embodiments of how a client and a server can utilize RSSI and RTT measurements to provide a processing delay estimate of the wireless AP.
Figure 5B:
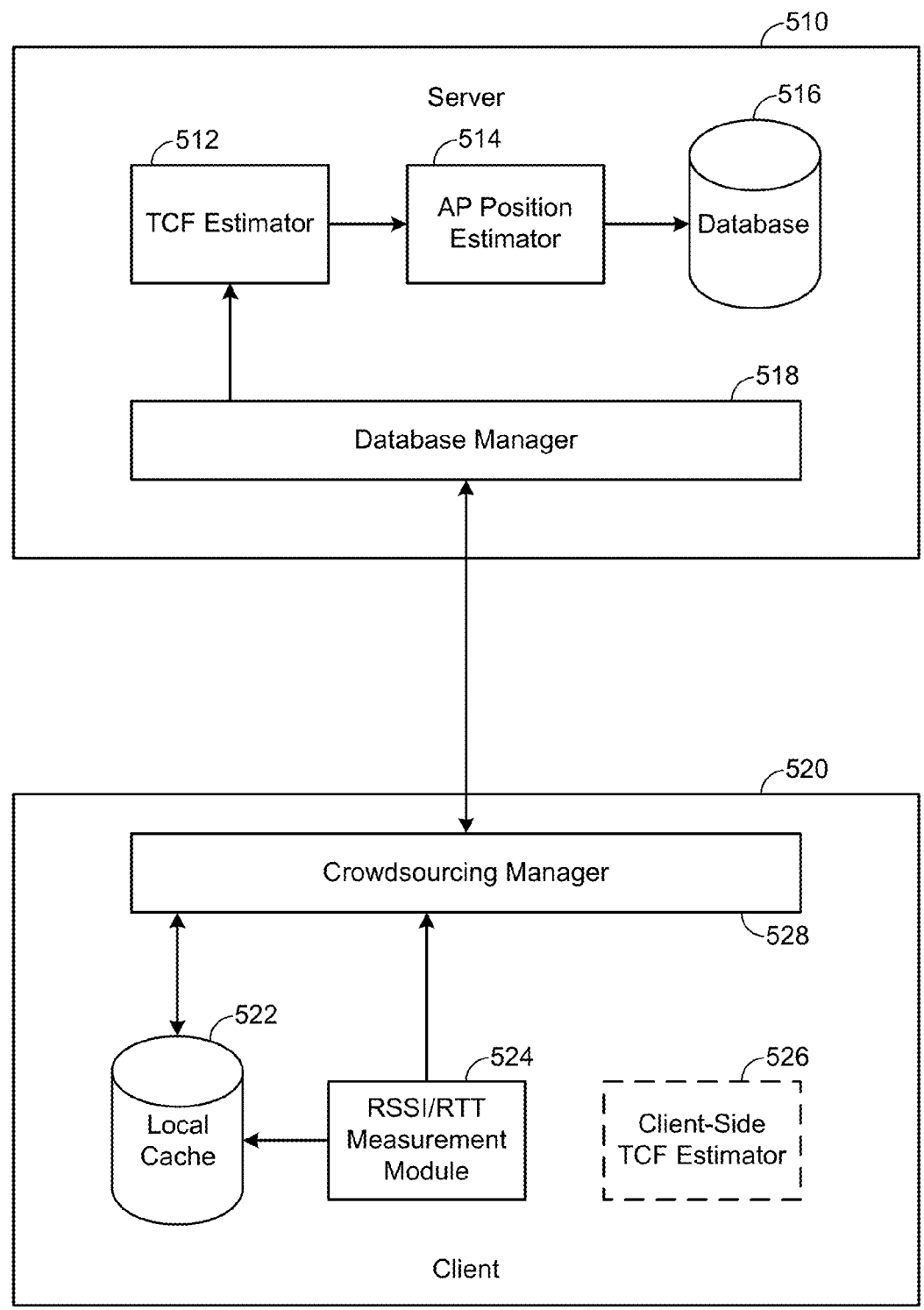

FIGS. 5A and 5B illustrate different embodiments 500 of how a client 520 and a server 510 can utilize RSSI and RTT measurements to provide a processing delay estimate of the wireless AP 120. The client 520 can comprise any combination of hardware and/or software executed by a mobile device 105. Example hardware and software features of a mobile device 105 are described in more detail below in regards to FIG. 8. The server 510 can be a computing system integrated and/or communicatively coupled with one or more wireless APs 120. Example hardware and software features of such a computing system are described in more detail below in regards to FIG. 9. Thus, the client and server can communicate data via wireless communication as described elsewhere herein.

Both embodiments 500 can include a client 520 with various subcomponents such as a local cache 522, RSSI/RTT measurement module 524, client-side TCF estimator 526, and crowdsourcing manager 528. The server can include a database manager 518, TCF estimator 512, AP position estimator 514, and a database. As with the other appended figures, FIGS. 5A and 5B provide only a generalized illustration of various components of these embodiments, any or all of which may be utilized as appropriate. Furthermore, components may be combined, separated, substituted, and/or omitted, depending on desired functionality. A person of ordinary skill in the art will recognize many modifications to the components illustrated.

The embodiment 500-1 of FIG. 5A utilizes a configuration in which the client 520 provides processing delay estimate to the server 510. Here, the RSSI/RTT measurement module 524 can enable the client 520 to obtain RSSI and RTT measurement data from one or more wireless APs 120. All or a portion of these measurements may be stored in the local cache 522, for example, in a table such as the table 400 shown in FIG. 4. The local cache 522 can also store other information related to positioning and/or identification, some or all of which may be sent to the server 510, depending on desired functionality. For example, the local cache 522 can store information regarding visited wireless AP MAC address(es), timestamp(s), positioning information (e.g., true position, relative position, etc.), and the like.

The client-side TCF estimator 526 can receive the RSSI and RTT measurement data from the RSSI/RTT measurement module 524 and generate one or more processing delay estimates, which are provided to the crowdsourcing manager 528. The crowdsourcing manager 528, which serves as the client's interface to the server 510 (and/or other devices), can provide the server with the client's one or more processing delay estimates. Depending on desired functionality, the one or more processing delay estimates can be provided in response to a request by the server and/or pushed by the client.

The server 510 is configured to receive and process the one or more processing delay estimates. The server 510 receives the one or more processing delay estimates through the database manager 518.

The database manager 518 comprises an interface with which the server 510 can communicate and receive crowdsourcing data from one or more mobile devices 105. The database manager 518 can further route received data to the TCF estimator 512 and/or the AP position estimator 514, depending on the type of data received. In some embodiments, the database manager 518 may automatically determine the type of data received by, for example, identifying a flag or other marker indicating data type and/or by reading the data itself.

The AP position estimator 514 can receive processing delay estimates to determine the distances between wireless APs. For example, when an RTT measurement is approximately equal to the estimated processing delay of a first wireless AP, a mobile device 105 can be assumed to be at or very near the first wireless AP. In other words, the estimated processing delay approximately equals the RTT measured when the mobile device 105 is very close to or under the first wireless AP, after taking into account floor height. At this point, the RTT measured by the mobile device 105 to a second wireless AP can be assumed to be twice the time of flight from the first wireless AP to the second wireless AP, plus the processing delay of the second wireless AP. Thus, if processing delay of the second wireless AP is computed independently, the distance between the first and second wireless APs can be easily obtained. Further details for estimating the processing delay of a wireless AP 120 in this manner are provided in Inter-AP Distance Estimation Application, which is incorporated by reference hereinabove. When pairwise AP distances for all pairs (or a subset) have been determined, some or all wireless APs may be located, at least in a relative coordinate system, using a suitable estimator method like multidimensional scaling (MDS). Pairwise wireless AP distances may be sent by many mobile devices 105 to the server 510 which aggregates and processes them using a mean, weighted mean or other combinatorial function.

The server 510 can store all or a portion of the one or more processing delay estimates in the database 516, for example, in a table such as the table 400 shown in FIG. 4. As described previously, the database can include processing delay estimates for a wireless AP 120 from multiple mobile devices 105, with which the server 510 can calculate a composite processing delay estimate. Composite processing delay estimates for multiple wireless APs 120 can be stored in the database, as well as other information related to positioning, such as an RSSI heatmap related to an area in which one or more wireless APs 120 are located, and the like.

Depending on desired functionality, the server 510 can maintain and/or update the composite processing delay estimate periodically and/or as needed (e.g., upon receiving new data relating to a processing delay of an AP). For example, upon receiving a one or more processing delay estimates from a mobile device, the server 510 can create and/or update a composite processing delay estimate using any of the techniques described above (e.g., weighted average, mean, etc.) based, in part, on the newly-received processing delay estimate(s). Furthermore, the server 510 can propagate the composite processing delay estimate back to the client 520 (and/or other clients and/or devices). Because the composite processing delay estimate is calculated using crowdsourced information from a plurality of clients, it can be more accurate than the one or more processing delay estimates calculated and/or maintained by each client individually. Thus, the accuracy of location-based calculations based on RTT measurements can be increased for all clients in a positioning system.

Because the TCF estimator 512 of the server may not be used in this embodiment, it may be an optional component of the server. However, if included, the TCF estimator could also enable the server to provide the functionality described with regard to FIG. 5B.

The embodiment 500-2 of FIG. 5B utilizes a configuration in which components of a server 510 and client 520 are similar to those shown in FIG. 5A. Here, however, the client 520 can provide the server with RSSI and RTT measurements from the RSSI/RTT measurement module 524, without necessarily providing a corresponding processing delay estimate. Instead, the RSSI and RTT measurements are relayed to a the TCF estimator 512 of the server 510, which calculates a processing delay estimate of a wireless AP 120 based on the RSSI and RTT measurements. Here, as indicated previously, the TCF estimator 512 can utilize RSSI and RTT measurements from multiple mobile devices 105, thereby being able to calculate a composite processing delay estimate based on crowdsourced data.

Although some embodiments described herein may not rely on positioning information to provide processing delay estimates, other embodiments may accommodate processing delay data having information about a known location of a mobile device. In other words, some embodiments can exploit ground truth information to increase the accuracy of the crowdsourced information. For example, a server 510 can receive information regarding an RTT measurement and a known location of a mobile device when the RTT measurement was taken. If the location of the wireless AP is also known, then true distance of the mobile device from the wireless AP can be calculated, and the time of flight associated with that distance can be subtracted from the RTT measurement, resulting in a highly accurate processing delay estimate based on an actual measured value of the processing delay. Additionally or alternatively, in the embodiment shown in FIG. 5A, this highly accurate processing delay estimate can be calculated by the client 520 and provided to the server 510.

A highly accurate processing delay estimate based on known location information can flagged as such and propagated to other devices (e.g., mobile devices) for positioning calculations. As indicated elsewhere herein, processing delay estimate can be given a confidence metric, enabling a server to weigh them accordingly when calculating a composite processing delay estimate from multiple other processing delay estimates. In the case of a highly accurate processing delay estimate based on known location information, the related confidence metric can be extremely high (or, alternatively, an uncertainty value can be at or near zero) to help ensure the highly accurate processing delay estimate is weighted accordingly. In some embodiments, the highly accurate processing delay estimate may simply replace a server's composite processing delay estimate.

Figure 6:
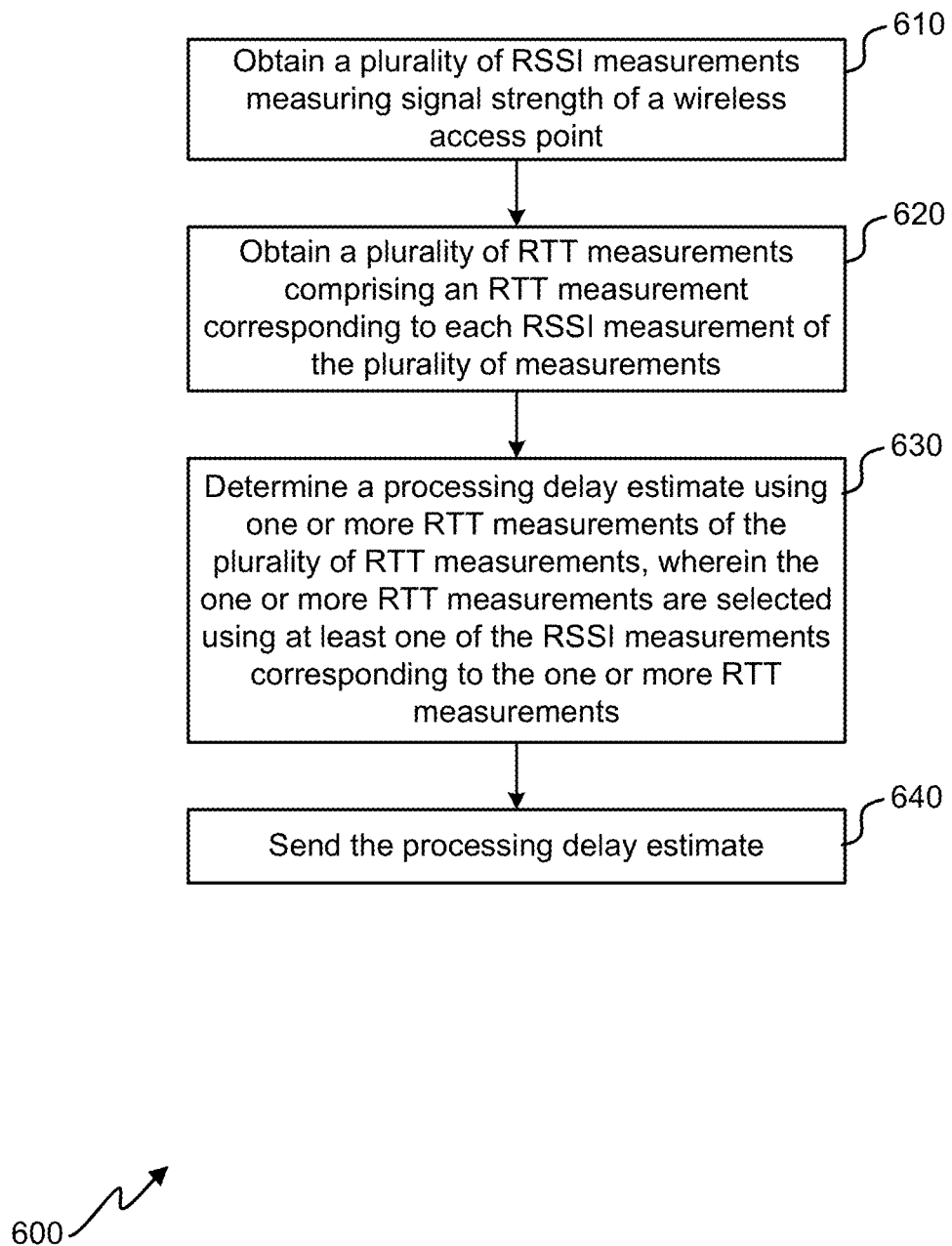
FIG. 6 is a simplified flow chart of a process for using a mobile device to provide a processing delay estimate associated with RTT measurements of a wireless AP, according to one embodiment.

FIG. 6 is a simplified flow chart of a process 600 for using a mobile device to provide a processing delay estimate associated with RTT measurements of a wireless AP, according to one embodiment. The process 600 can be executed by a mobile device, such as the mobile device 105 of FIGS. 1 and 2, which can execute a client, such as the client 520 of FIGS. 5A and 5B, to perform some or all of the process 600. Means for performing some or all of the components shown in FIG. 6 can include, for example, specialized and/or generalized hardware programmed and/or otherwise configured to perform the components shown. Such means are described in further detail below with regard to FIG. 8.

The process 600 can begin at block 610 by obtaining a plurality or RSSI measurements measuring signal strength of a wireless AP. As indicated previously, these measurements may be periodic, location based, as needed, based on a predetermined schedule, performed on demand (e.g., a request made by an application executed by the mobile device, a request sent from a separate device), and the like. Where a requesting device prompts a mobile device to obtain and/or send data, a data exchange can be made between the mobile device and the requesting device to authenticate and/or authorize the requesting device. Block 620 includes obtaining a plurality of RTT measurements comprising an RTT measurement corresponding to each RSSI measurement of the plurality of measurements. This can result, as illustrated above, in a plurality of RSSI and RTT measurements taken by a mobile device with respect to the wireless AP. Corresponding RSSI and RTT measurements can be paired up, as shown in table 400 of FIG. 4, to represent measurements taken at a certain time and/or location.

At block 630, a processing delay estimate is determined using one or more RTT measurements of the plurality of RTT measurements, where the one or more RTT measurements are selected using at least one of the RSSI measurements corresponding to the one or more RTT measurements. As indicated previously, embodiments can determine the processing delay estimate based on one or more RTT measurements representative of the wireless AP's processing delay. For example, the processing delay estimate may simply comprise an RTT measurement with the largest corresponding RSSI measurement. Additionally or alternatively, the processing delay can comprise a mean, weighted mean, and/or weighted average of the one or more RTT measurements. The one or more RTT measurements may be determined from a threshold RSSI measurement value, such that each RSSI measurement corresponding to the one or more RTT measurements has a value above the threshold RSSI measurement value. The mobile device may also determine a confidence value, such as a standard deviation, related to the processing delay estimate.

Embodiments may also determine the processing delay estimate by compensating for a distance of the mobile device from the wireless AP at each RTT measurement of the one or more RTT measurements. As stated previously, a pseudo range can be determined for the RTT measurement(s) using the corresponding RSSI measurement(s), and a time delay of the pseudo range can be subtracted from the RTT measurement(s) accordingly.

AT block 640, the processing delay estimate is sent. Depending on desired functionality, the processing delay can be sent periodically, at predetermined times, and/or as needed. For example, the processing delay estimate may be determined and sent based on a request from a server. The mobile device can also send information indicative of one or more hardware features of the mobile device, which can be used by a server to determine a reliability of the processing delay estimate and/or adjust the processing delay estimate as needed to correlate with processing delay estimates from mobile devices having different hardware features. As discussed above, the server can calculate a composite processing delay estimate using information from a plurality of mobile devices and propagate the composite processing delay estimate to the mobile devices. Thus, a mobile device providing a first processing delay estimate to a server can receive a second (composite) processing delay estimate from the server.

It should be appreciated that the specific steps illustrated in FIG. 6 provide an example process 600 for using a mobile device to provide a processing delay estimate associated with RTT measurements of a wireless AP. Alternative embodiments may include alterations to the embodiments shown. Furthermore, additional features may be added or removed depending on the particular applications. One of ordinary skill in the art would recognize many variations, modifications, and alternatives.

Figure 7:
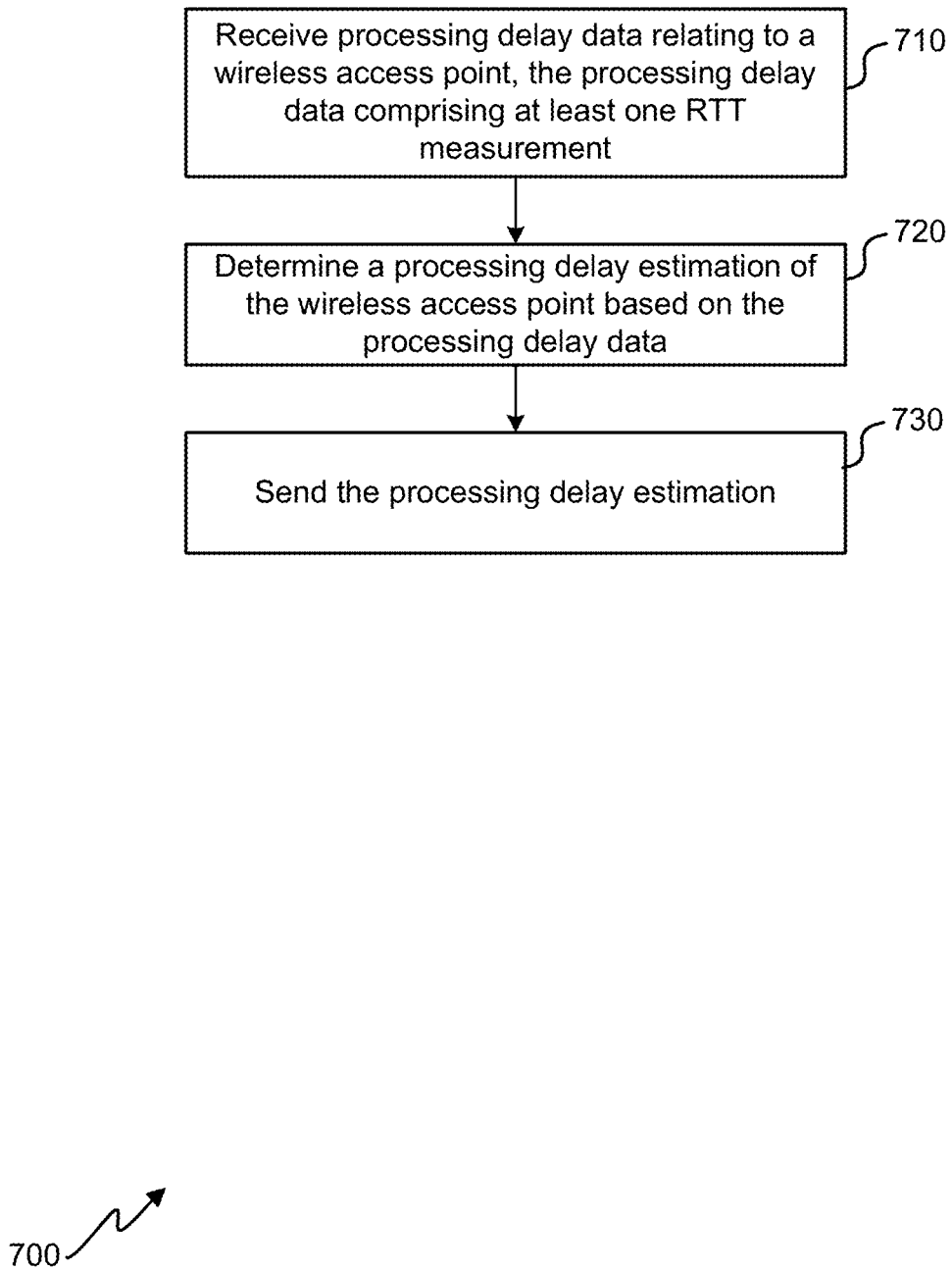
FIG. 7 is a simplified flow diagram of a process 700 for crowdsourcing a processing delay estimate of a wireless AP, according to one embodiment.

FIG. 7 is a simplified flow diagram of a process 700 for crowdsourcing a processing delay estimate of a wireless AP, according to one embodiment. The process 700 can be executed by a server, such as the server of FIGS. 5A and 5B, which may be executed by a computing device integrated and/or communicatively coupled with one or more wireless APs, such as the wireless APs 120 of FIG. 1. Additionally or alternatively, the process 700 may be performed by one or more mobile devices communicating with each other in, for example, an ad-hoc and/or peer-to-peer network. Means for performing some or all of the components shown in FIG. 7 can include, for example, specialized and/or generalized hardware programmed and/or otherwise configured to perform the components shown. Such means are described in further detail below with regard to FIG. 9.

The process 700 can begin at block 710 by receiving processing delay data relating to a wireless AP, the processing delay data comprising at least one RTT measurement. Such data can be received by, for example, a wireless communication interface of a server. Moreover, the data can be received, for example, from one or more mobile devices having taken a plurality of RSSI and RTT measurements with the mobile device. Depending on desired functionality, the processing delay data can comprise the RSSI and RTT measurements and/or related data, such as one or more processing delay estimates, a confidence value (e.g., a standard deviation), and the like. The RSSI and RTT measurement and/or related data can be stored by a server in, for example, a database. The database can have multiple tables, such as the table 400 of FIG. 4, each comprising processing delay data for a different wireless AP.

At block 720 a processing delay estimate of the wireless AP is determined based on the processing delay data. Where the processing delay data comprises a plurality of RSSI and RTT measurements, determining the processing delay estimate can include calculating a mean and/or standard deviation of the plurality of RTT measurements, and/or determining a weighted average of the plurality of RTT measurements. Weighting of the RTT measurements can be based on corresponding RSSI measurement values. For example, more weight can be given to RTT measurements with higher corresponding RSSI measurement values and/or confidence values.

The processing delay estimate may be determined based on a subset of a plurality of received RTT measurements. The subset can be determined using a threshold value, where each RTT measurement of the subset has a corresponding RSSI measurement above a threshold value. Additionally or alternatively, the determining the processing delay estimate can compensate distance by determining an estimated distance, corresponding to each RTT measurement of the plurality of RTT measurements, between the wireless AP and a mobile device. A time adjustment can be made to each RTT measurement based on the time of flight for this estimated distance. Additionally or alternatively, in cases where a mobile device's location is known, the data relating to the processing delay can comprise at least one RTT measurement and the known location of the mobile device. In such cases, the processing delay can be determined by determining the distance of the mobile device from the wireless AP using the known location of a mobile device and subtracting a time of flight associated with the distance from the RTT measurement.

At block 730, the processing delay estimate is sent. The processing delay estimate can be sent, for example, to one or more mobile devices to increase the accuracy of positioning calculations based on RTT measurements with the wireless AP. As with other communication described herein, the processing delay estimate can be sent at scheduled times, periodically, as needed, upon request by a client (mobile device), and/or pushed out by a server. The server may also update a stored value based on the processing delay information. For example, the server may maintain a prior processing delay estimate value, which it can update when calculating the processing delay estimate based on the processing delay data.

It should be appreciated that the specific steps illustrated in FIG. 7 provide an example process 700 for crowdsourcing a processing delay estimate of a wireless AP, according to one embodiment. Alternative embodiments may include alterations to the embodiments shown. Furthermore, additional features may be added or removed depending on the particular applications. One of ordinary skill in the art would recognize many variations, modifications, and alternatives.

Figure 8:
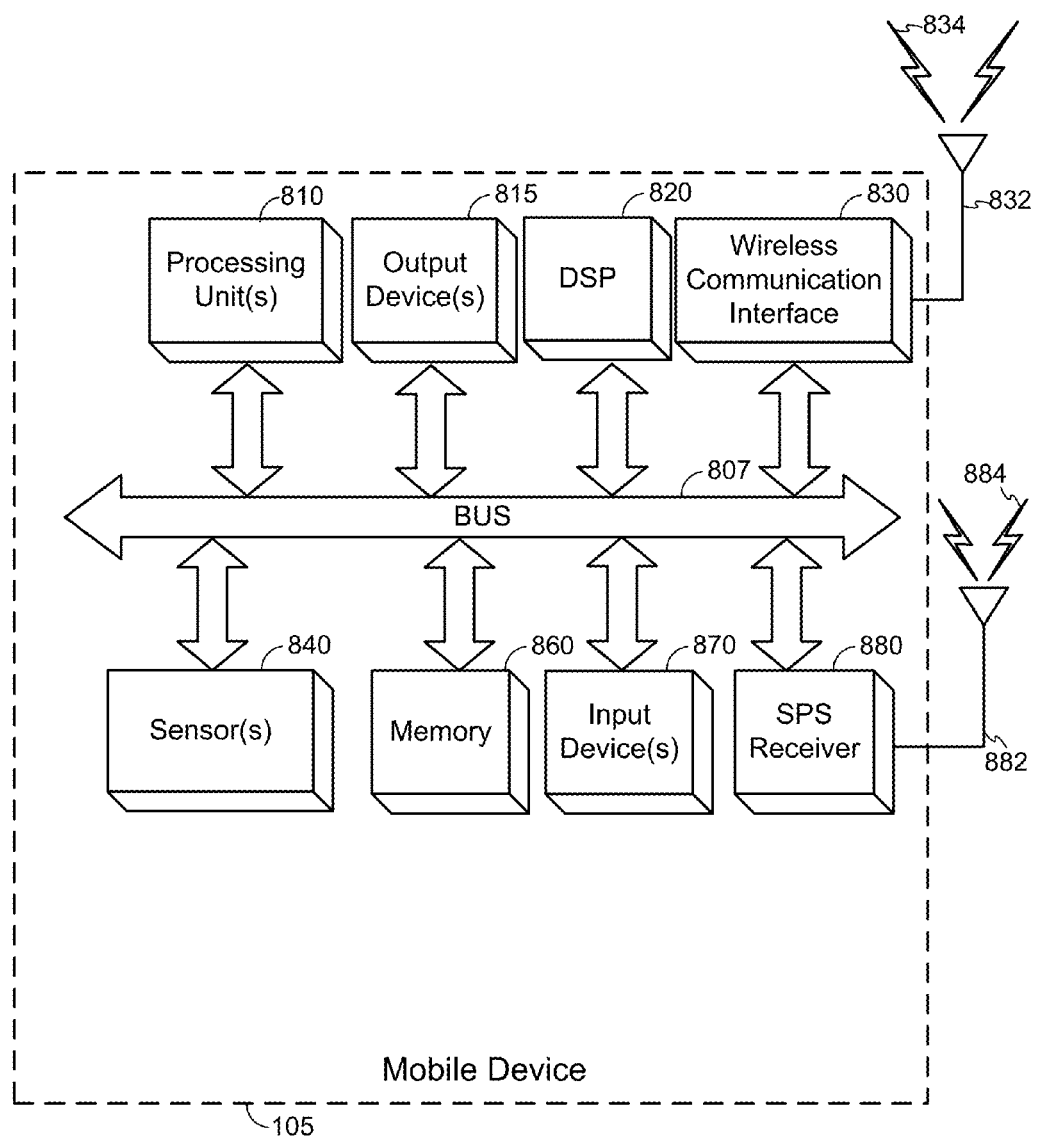
FIG. 8 is a block diagram of an embodiment of a mobile device.

FIG. 8 illustrates an embodiment of a mobile device 105, which can be utilized in the positioning system 100 of FIG. 1, execute a client 520 of FIGS. 5A and 5B, and/or configured to perform the methods provided by various other embodiments, such as the method described in relation to FIG. 6. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

It can also be noted that some or all of the components of the mobile device 105 shown in FIG. 8 can be utilized in other computing systems described herein, such as wireless AP(s) 120 of FIG. 1. In these other systems, as well as the mobile device 105, it can be noted that components illustrated by FIG. 8 can be localized to a single device and/or distributed among various networked devices, which may be disposed at different physical locations.

The mobile device 105 is shown comprising hardware elements that can be electrically coupled via a bus 807 (or may otherwise be in communication, as appropriate). The hardware elements may include a processing unit(s) 810 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein, including method illustrated in FIG. 6. As shown in FIG. 8, some embodiments may have a separate DSP 820, depending on desired functionality. The mobile device 105 also can include one or more input devices 870, which can include without limitation a touch screen, a touch pad, microphone, button(s), dial(s), switch(es), and/or the like; and one or more output devices 815, which can include without limitation a display, light emitting diode (LED), speakers, and/or the like.

The mobile device 105 might also include a wireless communication interface 830, which can include without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities, etc.), and/or the like. The wireless communication interface 830 may permit data to be exchanged with a network, wireless APs, other computer systems, and/or any other electronic devices described herein. The communication can be carried out via one or more wireless communication antenna(s) 832 that send and/or receive wireless signals 834.

Depending on desired functionality, the wireless communication interface 830 can include separate transceivers to communicate with base transceiver stations (e.g., base stations of a cellular network) and APs (e.g., AP(s) 120 of FIG. 1). These different data networks can include a wide area wireless network (WWAN), a wireless local area network (WLAN), a wireless personal area network (WPAN), and the like. The term "network" and "system" as used herein may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may implement Long Term Evolution (LTE), LTE Advanced, and so on. LTE, LTE Advanced, GSM, and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The mobile device 105 can further include sensor(s) 840. Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 840 can be utilized, among other things, for dead reckoning calculations to complement and/or further improve the accuracy of location determinations.

Embodiments of the mobile device may also include a Satellite Positioning System (SPS) receiver 880 capable of receiving signals 884 from one or more SPS satellites using an SPS antenna 882. Such positioning can be utilized to complement and/or incorporate the techniques described herein. The SPS receiver 880 can extract a position of the mobile device, using conventional techniques, from SPS satellite vehicles (SVs) of an SPS system, such as Global Navigation Satellite System (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 880 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 860. The memory 860 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 860 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 6, might be implemented as code and/or instructions executable by the mobile device 105 (and/or a processing unit within a mobile device 105) (and/or another device of a positioning system). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 9:
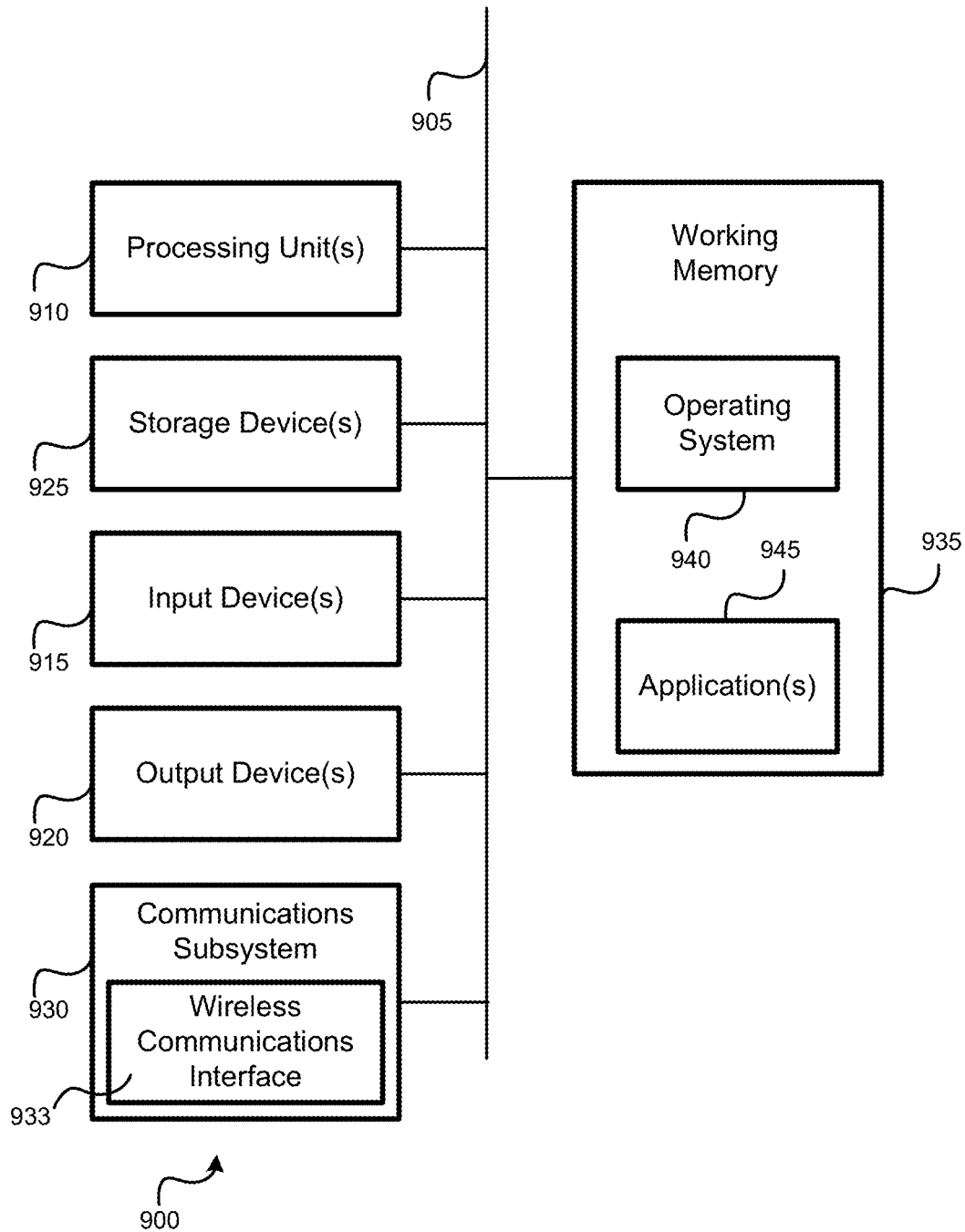
FIG. 9 is a block diagram of an embodiment of a computer system.

FIG. 9 illustrates an embodiment of a computer system 900, which may be incorporated, at least in part, into devices such the AP(s) 120 of FIGS. 1-2 and/or a server incorporated and/or communicatively connected therewith. FIG. 9 provides a schematic illustration of one embodiment of a computer system 900 that can perform the methods provided by various other embodiments, such as the method described in relation to FIG. 7. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different physical locations.

The computer system 900 is shown comprising hardware elements that can be electrically coupled via a bus 905 (or may otherwise be in communication, as appropriate). The hardware elements may include processing unit(s) 910, which can include without limitation one or more general-purpose processors, one or more special-purpose processors (such as digital signal processing chips, graphics acceleration processors, and/or the like), and/or other processing structure, which can be configured to perform one or more of the methods described herein, including the method illustrated in FIG. 7. The computer system 900 also can include one or more input devices 915, which can include without limitation a mouse, a keyboard, a camera, a microphone, other biometric sensors, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include wireless communication technologies managed and controlled by a wireless communication interface 933, as well as wired technologies. As such, the communications subsystem can include a modem, a network card (wireless or wired), an infrared communication device, a wireless communication device, and/or a chipset (such as a Bluetooth™ device, an IEEE 902.11 device, an IEEE 902.15.4 device, a WiFi device, a WiMax device, cellular communication facilities, UWB interface, etc.), and/or the like. The communications subsystem 930 may include one or more input and/or output communication interfaces, such as the wireless communication interface 933, to permit data to be exchanged with a network, mobile devices (such as the mobile devices 105 of FIGS. 1, 2, and 8), other computer systems, and/or any other electronic devices described herein.

In many embodiments, the computer system 900 will further comprise a working memory 935, which can include a RAM or ROM device, as described above. Software elements, shown as being located within the working memory 935, can include an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 7, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

With reference to the appended figures, components that can include memory, such as database 516 and local cache 522 can include non-transitory machine-readable media. The terms "machine-readable medium," "computer-readable medium," "machine-readable storage medium," and "computer-readable storage medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for using a mobile device to provide a processing delay estimate associated with round trip time (RTT) measurements of a wireless access point, the method comprising:

obtaining, at the mobile device, a plurality of received signal strength indication (RSSI) measurements measuring a signal strength of the wireless access point at the mobile device;
obtaining a plurality of RTT measurements comprising an RTT measurement corresponding to each RSSI measurement of the plurality of RSSI measurements;
after obtaining the plurality of RTT measurements, determining a first processing delay estimate using one or more RTT measurements of the plurality of RTT measurements, wherein:
the one or more RTT measurements are selected using at least one of the RSSI measurements corresponding to the one or more RTT measurements, and
determining the first processing delay estimate includes, for each of the one or more RTT measurements, determining a weight of the RTT measurement based on a value of the corresponding RSSI measurement; and
sending, using the mobile device, the first processing delay estimate.

2. The method of claim 1, wherein the first processing delay estimate comprises an RTT measurement representative of a processing delay of the wireless access point.

3. The method of claim 1, wherein each RSSI measurement corresponding to the one or more RTT measurements has a value above a threshold value.

4. The method of claim 1, wherein the first processing delay estimate comprises a mean, a weighted mean, or a weighted average of the one or more RTT measurements.

5. The method of claim 4, further comprising sending, using the mobile device, a confidence value related to the first processing delay estimate.

6. The method of claim 5, wherein the confidence value comprises a standard deviation.

7. The method of claim 1, further comprising sending, using the mobile device, information indicative of one or more hardware features of the mobile device.

8. The method of claim 1, wherein determining the first processing delay estimate further comprises compensating for a distance of the mobile device from the wireless access point for each RTT measurement of the one or more RTT measurements.

9. The method of claim 1, further comprising receiving, with the mobile device, a second processing delay estimate.

10. A method for crowdsourcing a processing delay estimate of a wireless access point, the method comprising:
receiving processing delay data relating to the wireless access point, the processing delay data comprising:
a plurality of round trip time (RTT) measurements, and
a plurality of received signal strength indication (RSSI) measurements,
wherein each RSSI measurement of the plurality of RSSI measurements corresponds to an RTT measurement of the plurality of RTT measurements;
determining the processing delay estimate of the wireless access point, based on the processing delay data, wherein determining the processing delay estimate includes:
determining a weight of each RTT measurement of the plurality of RTT measurements based on a value of the corresponding RSSI measurement, and
determining a weighted average of the plurality of RTT measurements; and
sending the processing delay estimate via a wireless communications interface.

11. The method of claim 10, wherein determining the processing delay estimate includes using a subset of the plurality of RTT measurements where each RTT measurement of the subset has a corresponding RSSI measurement above a threshold value.

12. The method of claim 10, wherein determining the processing delay estimate includes determining an estimated distance between the wireless access point and a mobile device corresponding to each RTT measurement of the plurality of RTT measurements.

13. The method of claim 10, further comprising storing a confidence value associated with each RTT measurement of the plurality of RTT measurements.

14. The method of claim 10, wherein the processing delay data further comprises a known location of a mobile device.

15. The method of claim 14, wherein determining the processing delay estimate includes:
determining a distance of the mobile device from the wireless access point using the known location of the mobile device; and
subtracting a time of flight associated with the distance from the RTT measurement.

16. The method of claim 10, further comprising updating a stored value based on the processing delay estimate.

17. A mobile device adapted to provide a processing delay estimate of a wireless access point associated with round trip time (RTT) measurements, the mobile device comprising:
a wireless communications interface;
a processing unit communicatively coupled with the wireless communications interface; and
a memory coupled to the processing unit, wherein the memory stores executable instructions for causing the processing unit to:
obtain a plurality of received signal strength indication (RSSI) measurements measuring a signal strength of the wireless access point at the mobile device;
obtain a plurality of RTT measurements comprising an RTT measurement corresponding to each RSSI measurement of the plurality of RSSI measurements;
determine, after obtaining the plurality of RTT measurements, a first processing delay estimate using one or more RTT measurements of the plurality of RTT measurements, wherein:
the one or more RTT measurements are selected using at least one of the RSSI measurements corresponding to the one or more RTT measurements, and
determining the first processing delay estimate includes, for each of the one or more RTT measurements, determining a weight of the RTT measurement based on a value of the corresponding RSSI measurement; and
send the first processing delay estimate.

18. The mobile device of claim 17, wherein the instructions for determining the first processing delay estimate include instructions for determining the first processing delay estimate from an RTT measurement representative of a processing delay of the wireless access point.

19. The mobile device of claim 17, wherein the memory further stores instructions for causing the processing unit to obtain each RSSI measurement corresponding to the one or more RTT measurements based on the RSSI measurement having a value above a threshold value.

20. The mobile device of claim 17, wherein the first processing delay estimate comprises a mean, a weighted mean, or a weighted average of the one or more RTT measurements.

21. The mobile device of claim 20, wherein the memory further stores instructions for causing the processing unit to send a confidence value related to the first processing delay estimate.

22. The mobile device of claim 17, wherein the memory further stores instructions for causing the processing unit to send, via the wireless communications interface, information indicative of one or more hardware features of the mobile device.

23. The mobile device of claim 17, wherein the instructions for determining the first processing delay estimate further comprise instructions for compensating for a distance of the mobile device from the wireless access point at each RTT measurement of the one or more RTT measurements.

24. The mobile device of claim 17, wherein the memory further stores instructions for receiving a second processing delay estimate.

25. A server for crowdsourcing a processing delay estimate of a wireless access point, the server comprising:
 a wireless communications interface;
 a processing unit communicatively coupled with the wireless communications interface; and
 a memory coupled to the processing unit, wherein the memory stores executable instructions for causing the processing unit to:
  receive, via the wireless communications interface, processing delay data of the wireless access point, the processing delay data comprising:
   a plurality of round trip time (RTT) measurements, and
   a plurality of received signal strength indication (RSSI) measurements,
   wherein each RSSI measurement of the plurality of RSSI measurements corresponds to an RTT measurement of the plurality of RTT measurements;
  determine the processing delay estimate of the wireless access point, based on the processing delay data, wherein determining the processing delay estimate includes:
   determining a weight of each RTT measurement of the plurality of RTT measurements based on a value of the corresponding RSSI measurement, and
   determining a weighted average of the plurality of RTT measurements; and
  send the processing delay estimate via the wireless communications interface.

26. The server of claim 25, wherein the instructions for causing the processing unit to determine the processing delay estimate include instructions for causing the processing unit to use a subset of the plurality of RTT measurements where each RTT measurement of the subset has a corresponding RSSI measurement above a threshold value.

27. The server of claim 25, wherein the instructions for causing the processing unit to determine the processing delay estimate include instructions for causing the processing unit to determine an estimated distance between the wireless access point and a mobile device corresponding to each RTT measurement of the plurality of RTT measurements.

28. The server of claim 25, further comprising instructions for causing the processing unit to store a confidence value associated with each RTT measurement of the plurality of RTT measurements.

29. The server of claim 25, wherein the instructions for causing the processing unit to receive processing delay data include instructions for causing the processing unit to receive a known location of a mobile device.

30. The server of claim 29, wherein the instructions for causing the processing unit to determine the processing delay estimate include instructions for causing the processing unit to:
 determine a distance of the mobile device from the wireless access point using the known location of the mobile device; and
 subtract a time of flight associated with the distance from the RTT measurement.

31. The server of claim 25, further comprising instructions for causing the processing unit to update a stored value based on the processing delay estimate.

32. A non-transitory computer-readable storage medium having instructions stored thereon for causing a processing unit to:
 obtain a plurality of received signal strength indication (RSSI) measurements measuring a signal strength of a wireless access point at a mobile device;
 obtain a plurality of RTT measurements comprising an RTT measurement corresponding to each RSSI measurement of the plurality of RSSI measurements;
 after obtaining the plurality of RTT measurements, determine a first processing delay estimate using one or more RTT measurements of the plurality of RTT measurements, wherein:
  the one or more RTT measurements are selected using at least one of the RSSI measurements corresponding to the one or more RTT measurements, and
  determining the first processing delay estimate includes, for each of the one or more RTT measurements, determining a weight of the RTT measurement based on a value of the corresponding RSSI measurement; and
 send the first processing delay estimate.

33. The computer-readable storage medium of claim 32, wherein the instructions for determining the first processing delay estimate include instructions for determining the first processing delay estimate from an RTT measurement representative of a processing delay of the wireless access point.

34. The computer-readable storage medium of claim 32, further comprising instructions for causing the processing unit to obtain each RSSI measurement corresponding to the one or more RTT measurements based on the RSSI measurement having a value above a threshold value.

35. The computer-readable storage medium of claim 32, wherein the first processing delay estimate comprises a mean, a weighted mean, or a weighted average of the one or more RTT measurements.

36. The computer-readable storage medium of claim 35, further comprising instructions for causing the processing unit to send a confidence value related to the first processing delay estimate.

37. The computer-readable storage medium of claim 32, further comprising instructions for causing the processing unit to send information indicative of one or more hardware features of the mobile device.

38. The computer-readable storage medium of claim 32, wherein the instructions for determining the first processing delay estimate further comprise instructions for compensating for a distance of the mobile device from the wireless access point at each RTT measurement of the one or more RTT measurements.

39. The computer-readable storage medium of claim 32, further comprising instructions for causing the processing unit to receive, with the mobile device, a second processing delay estimate.

40. A non-transitory computer-readable storage medium having instructions stored thereon for causing a processing unit to:
 receive processing delay data of a wireless access point, the processing delay data comprising:
  a plurality of round trip time (RTT) measurements, and a plurality of received signal strength indication (RSSI) measurements,
wherein each RSSI measurement of the plurality of RSSI measurements corresponds to an RTT measurement of the plurality of RTT measurements;
determine a processing delay estimate of the wireless access point, based on the processing delay data, wherein determining the processing delay estimate includes:
determining a weight of each RTT measurement of the plurality of RTT measurements based on a value of the corresponding RSSI measurement, and
determining a weighted average of the plurality of RTT measurements; and
send the processing delay estimate via a wireless communications interface.

41. The computer-readable storage medium of claim 40, wherein the instructions for causing the processing unit to determine the processing delay estimate include instructions for causing the processing unit to use a subset of the plurality of RTT measurements where each RTT measurement of the subset has a corresponding RSSI measurement above a threshold value.

42. The computer-readable storage medium of claim 40, wherein the instructions for causing the processing unit to determine the processing delay estimate include instructions for causing the processing unit to determine an estimated distance between the wireless access point and a mobile device corresponding to each RTT measurement of the plurality of RTT measurements.

43. The computer-readable storage medium of claim 40, further comprising instructions for causing the processing unit to store a confidence value associated with each RTT measurement of the plurality of RTT measurements.

44. The computer-readable storage medium of claim 40, wherein the instructions for causing the processing unit to receive processing delay data include instructions for causing the processing unit to receive a known location of a mobile device.

45. The computer-readable storage medium of claim 44, wherein the instructions for causing the processing unit to determine the processing delay estimate include instructions for causing the processing unit to:
determine a distance of the mobile device from the wireless access point using the known location of the mobile device; and
subtract a time of flight associated with the distance from the RTT measurement.

46. The computer-readable storage medium of claim 40, further comprising instructions for causing the processing unit to update a stored value based on the processing delay estimate.

47. A mobile device comprising:
means for obtaining a plurality of received signal strength indication (RSSI) measurements measuring a signal strength of a wireless access point at the mobile device;
means for obtaining a plurality of round trip time (RTT) measurements comprising an RTT measurement corresponding to each RSSI measurement of the plurality of RSSI measurements;
means for determining, after obtaining the plurality of RTT measurements, a first processing delay estimate using one or more RTT measurements of the plurality of RTT measurements, wherein:
the one or more RTT measurements are selected using at least one of the RSSI measurements corresponding to the one or more RTT measurements, and
determining the first processing delay estimate includes, for each of the one or more RTT measurements, determining a weight of the RTT measurement based on a value of the corresponding RSSI measurement; and
means for sending, using the mobile device, the first processing delay estimate.

48. The mobile device of claim 47, wherein the means for determining the first processing delay estimate are configured to determine the first processing delay estimate from an RTT measurement representative of a processing delay of the wireless access point.

49. The mobile device of claim 47, wherein the means for determining the first processing delay estimate are configured to determine the one or more RTT measurements that have corresponding RSSI measurements above a threshold value.

50. The mobile device of claim 47, wherein the means for determining the first processing delay estimate are configured to determine the first processing delay estimate using a mean, a weighted mean, or a weighted average of the one or more RTT measurements.

51. The mobile device of claim 50, further comprising means sending, a confidence value related to the first processing delay estimate.

52. The mobile device of claim 47, further comprising means determining the first processing delay estimate further comprise means for compensating for a distance of the mobile device from the wireless access point at each RTT measurement of the one or more RTT measurements.

53. The mobile device of claim 47, further comprising means for receiving an updated processing delay estimate.

54. A system comprising:
means for receiving processing delay data of a wireless access point, the processing delay data comprising:
a plurality of round trip time (RTT) measurements, and
a plurality of received signal strength indication (RSSI) measurements,
wherein each RSSI measurement of the plurality of RSSI measurements corresponds to an RTT measurement of the plurality of RTT measurements;
means for determining a processing delay estimate of the wireless access point, based on the processing delay data, wherein the means for determining the processing delay estimate includes:
means for determining a weight of each RTT measurement of the plurality of RTT measurements based on a value of the corresponding RSSI measurement, and
means for determining a weighted average of the plurality of RTT measurements; and
means for sending the processing delay estimate via a wireless communications interface.

55. The system of claim 54, wherein the means for determining the processing delay estimate include means for using a subset of the plurality of RTT measurements where each RTT measurement of the subset has a corresponding RSSI measurement above a threshold value.

56. The system of claim 54, wherein the means for determining the processing delay estimate include means for determining an estimated distance between the wireless access point and a mobile device corresponding to each RTT measurement of the plurality of RTT measurements.

57. The system of claim 54, further comprising means for storing a confidence value associated with each RTT measurement of the plurality of RTT measurements.

58. The system of claim 54, wherein the means for receiving processing delay data of a wireless access point include means for receiving a known location of a mobile device.

59. The system of claim 58, wherein the means for determining the processing delay estimate include means for:
   determining a distance of the mobile device from the wireless access point using the known location of the mobile device; and
   subtracting a time of flight associated with the distance from the RTT measurement.

60. The system of claim 54, further comprising means for updating a stored value based on the processing delay estimate.

* * * * *